United States Patent Office

2,911,302
Patented Nov. 3, 1959

2,911,302

EGG INSTANT COFFEE

Fletcher A. Chase, Morris Plains, and Samuel Lee, Fair Lawn, N.J., and Frederick D. Montgomery, Chicago, Ill., assignors, by direct and mesne assignments, of one-half to William L. McLennan, doing business as North Woods Coffee Company, Chicago, Ill., and one-half to American Instants Incorporated, a corporation of New York No Drawing. Application October 22, 1956
Serial No. 617,289

4 Claims. (Cl. 99—71)

This invention relates to a novel solid soluble coffee concentrate of the type known as instant coffee, and to the process of producing it. More particularly it relates to such a coffee concentrate of improved flavor, made by mixing with a conventional liquid coffee concentrate before spray-drying an infusion made by heating a mixture of ground roasted coffee and whole eggs in water.

The use of eggs in brewing coffee is an old household art that goes back many, many years; usually eggshells or egg whites were added to boiled coffee before decantation, the result being to improve the clarity of the beverage. This practice has fallen into general disuse in this country with the advent of mechanically greatly improved coffee-brewing apparatus such as percolators, drip coffee-pots and vacuum brewers.

In the technical and patent literature the use of eggs or egg products in brewing coffee appears to be controversial. In U.S. Patent 87,346 of March 2, 1869, Lewis disclosed a product consisting of ground coffee mixed with pulverized desiccated eggs or fish skins; in U.S. Patent 1,151,373 of August 24, 1915, Morley claimed a coffee-clearing compound composed of eggs, unburnt sugar, burnt sugar and a preservative; in U.S. Patent 1,897,393 of February 14, 1933, Livingston disclosed a product consisting of dry coffee granules thoroughly mixed with comminuted desiccated egg albumen; and in U.S. Patent 2,116,308 of May 3, 1938, Gore and Frey disclosed a process of preparing liquid coffee extract which involved fractionally extracting ground roasted coffee with water under specified time and temperature conditions and further disclosed that sedimentation may be improved by adding egg albumen to the filtered extract and heating. These patents were directed chiefly to clarification of the infusion.

On the other hand, F. N. Foot, in "Coffee, the Beverage" (The Spice Mill Publishing Co., 97 Water Street, New York, 1925), writes on page 113:

"The use of eggs in the brewing of coffee is a wicked waste and worse than useless. Putting an egg into the coffee forms a coating around the particles of coffee and to a considerable extent prevents the absorption by the water of the virtues of the coffee."

We have discovered that whole natural eggs may be usefully used in producing a soluble solid coffee concentrate of surprisingly improved flavor.

It is an object of our invention to produce a solid soluble coffee concentrate of improved flavor by a simple and economical process. It is a further object of our invention to provide a process that will up-grade less desirable types of coffee to a degree permitting their use in making a high-grade solid soluble coffee concentrate. Other objects and advantages of our invention will be apparent to those skilled in the art from the following disclosure.

According to our invention we first prepare a hot clarified egg-modified aqueous extract of ground roasted coffee, blend a minor proportion of this with a major proportion of a cool concentrated aqueous extract of ground roasted coffee such as is customarily produced in the manufacture of instant coffee, and then spray-dry the mixture of extracts to produce a solid soluble coffee concentrate.

The eggs used in our process are natural whole eggs minus the shell. The eggs may be fresh whole shelled eggs or fresh-frozen shelled eggs; the latter are more convenient to use on a large scale and have been found in all respects equal for our purpose to the unfrozen eggs. Eggs which are slightly deteriorated in any way must be excluded.

We mix the whole eggs with freshly ground roasted coffee, preferably in a weight ratio of one part whole eggs to three parts of coffee; the ratio may, however, vary from 1:1 to 1:20, eggs to coffee. Cold water is added and the mixture thoroughly agitated and heated; the solids are separated from the hot liquid extract. The weight ratio of water to coffee is preferably 3:1 but may vary from 2:1 to 10:1.

This liquid extract has the extraordinary property of being able to improve the flavor of a substantially larger quantity of cold coffee extract such as is produced in the manufacture of instant coffee. As little as one part of the egg-treated extract on a solids basis has a detectable effect upon the flavor of 100 parts of cold coffee extract. This appears to reach a maximum at 10 parts egg modified coffee to 100 parts cold extract and after that begins to level off. Therefore, we can use as much as 100 parts egg modified coffee to 100 parts cold extract, but use of above 10 parts of egg coffee would seem to be a needless waste of eggs.

The mixed liquid cold extract and hot extract are then dehydrated in any conventional method for the drying of instant coffee, such as spray drying, drum drying, vacuum drying, etc. The resulting solid product is an instant coffee of improved flavor; it is packaged, sold and used in the usual way.

Alternatively the egg-treated extract may be spray-dried without mixing with other extract and will then furnish a superior solid soluble coffee concentrate, but this is unnecessarily costly in view of the surprisingly beneficial effect of blending the egg-treated extract with conventional extract as described.

One of the advantages of our invention is the effect it has on the flavor of certain types of coffee that are ordinarily considered inferior. Such coffees have basically sound flavor and aroma characteristics but these basically sound properties are overlaid to varying degrees with a harsh and acrid taste. Examples of such coffees are Ivory Coast, Belgian Congo and Rio coffees. By the practice of our invention as described above, these undesirable factors are removed or neutralized, so that substantial amounts of less costly coffees may be used in making a product of satisfactorily high grade.

We have established no explanation for the surprising effect of a minor amount of egg-modified coffee extract on a major amount of conventional extract, but it is well known that eggs are extremely complex biological units. Both the white and yolk contain amounts of water-soluble materials, e.g. glucose and mineral salts. Typical analyses are quoted in Winton's "Structure and Composition of Foods," vol. III (1937), pages 222 and 223:

APPROXIMATE COMPOSITION OF EDIBLE PARTS OF EGGS

| | Water, percent | Protein, percent | Glycerides, percent | Cholesterol lutein, etc., percent | Lecithin, cephalin, percent | Glucose, percent | Mineral salts, percent |
|---|---|---|---|---|---|---|---|
| Edible portion | 73.4 | 13.4 | 6.4 | 2.2 | 3.6 | 0.3 | 0.7 |
| White | 87.0 | 12.0 | tr. | 0.0 | 0.0 | 0.4 | 0.6 |
| Yolk | 48.8 | 16.0 | 18.0 | 6.0 | 10.0 | 0.2 | 1.0 |

| | Water, percent | Protein, percent | Fat, percent | Phosphatids, percent | Extractives, percent |
|---|---|---|---|---|---|
| Yellow yolk | 47.8 | 28.8 | 49.2 | 20.9 | 0.6 |
| White yolk | 88.1 | 43.5 | 36.8 | 11.1 | 3.4 |

Whatever the mechanism may be by which the results of our invention are produced, it appears that both whites and yolks contribute.

While we prefer to use hens' eggs in our process, the eggs of other domestic fowl, such as turkeys, guinea fowl, geese and ducks, being similar in composition, may be used.

The following example describes one embodiment of our invention but is intended to be illustrative only and not to limit its scope which is defined in the appended claims.

*Example*

One 30 pound can of shelled unsugared fresh-frozen eggs (i.e. eggs to which no glycerine or sugar has been added) is allowed to thaw partially and the contents are thoroughly mixed with 80 lb. ground roasted coffee and 250 lb. cold water. The coffee blend used may vary considerably in composition, e.g. Santos 30–60 percent, mild coffees 20–40 percent, and African 0–30 percent. The mixture is heated to boiling with agitation and held at the boiling point for 5 minutes. Alternatively a somewhat wider range of temperature and time may be used, e.g. 88°–100° C. for 5 minutes to 1 hour. Insolubles consisting of coffee grounds and coagulated egg constituents are separated by centrifuging from the clear brown coffee liquor.

A conventional concentrated aqueous coffee extract is prepared by passing water through coffee in a battery of percolators in a descending temperature gradient, taking the finished liquor off at a low temperature, preferably not above about 25° C. as disclosed in Ornfelt U.S. Patent 2,515,730. The concentration of dissolved solids in this liquor may range from about 30 to over 50 percent, depending on operating conditions. (The blend of coffee so extracted may be the same as that used in the hot egg-modified extraction.)

The clear egg-modified filtrate is then blended with such an amount of the low-temperature extract as to provide a ratio of approximately 1.2 oz. eggs (as introduced into the process) to one pound of soluble coffee solids. Thus if the cold extract is of 45 percent concentration, the hot extract as prepared above with 30 lb. eggs and containing some 24 lb. coffee solubles will be added to some 800–850 lb. cold extract containing around 375 lb. coffee solubles. The mixed extracts are then spray-dried in the usual way to produce a solid soluble coffee concentrate—a so-called instant coffee—having, when made into a beverage by solution in hot or cold water, a flavor superior to that obtainable from the same coffee blend without egg treatment.

As pointed out above, the ratios of materials used in the example are not critical but may be varied within the designated limits, depending on the blend of coffee used, economic factors and other variables inherent in processing natural products. While the process of the Ornfelt Patent 2,515,730 is preferable for making the major extract to which the minor amount of egg-modified extract is added, our process can advantageously be applied to any commercial liquid coffee concentrate prior to spray-drying in an instant coffee process. The last step in making such an extract, however, is preferably carried out at a temperature well below the boiling point, say not above 50° C.

We claim:
1. The process of improving the flavor of instant coffee which comprises: mixing shelled whole eggs with ground roasted coffee and water, heating the mixture, separating a clear filtrate from the undissolved residue, mixing from about 1 part to about 10 parts on a solids basis of the filtrate with about 100 parts on a solids basis of a concentrated aqueous extract of ground roasted coffee untreated with eggs, and drying the resulting liquid mixture, whereby a solid soluble coffee concentrate of improved flavor is obtained.

2. The process of improving the flavor of instant coffee which comprises: mixing shelled whole eggs with ground roasted coffee in a weight ratio in the range 1:1 to 1:20, eggs to coffee, and adding water in a weight ratio in the range 2:1 to 10:1, water to coffee; agitating and heating the mixture at 88° to 100° C. for from 5 minutes to 1 hour; separating a clear filtrate from the undissolved solids; mixing from about 1 part to about 10 parts on a solids basis of the filtrate with about 100 parts on a solids basis of a concentrated aqueous coffee extract untreated with eggs; and spray drying the mixture.

3. The process of improving the flavor of instant coffee as defined in claim 2 in which the ratio of eggs to coffee in the first mentioned extract is 1:3 and said first mentioned extract is mixed with the second mentioned extract in a ratio corresponding to 1.2 parts eggs used to 16 parts coffee solubles in the mixed extracts.

4. In a process for making instant coffee by passing hot water through ground roasted coffee in a battery of percolators at a descending temperature gradient, drawing off the resulting concentrated coffee extract containing from 30 to more than 50 percent dissolved solids from the battery at a temperature below 50° C. and spray-drying the extract, the improvement which comprises: mixing shelled whole unsugared eggs and ground roasted coffee in a weight ratio in the range 1:1 to 1:20, eggs to coffee, adding water in a weight range 2:1 to 10:1, water to coffee, agitating and boiling the mixture, separating a clear filtrate from the solids, mixing from about 1 part to about 10 parts on a solids basis of the filtrate with about 100 parts on a solids basis of the first mentioned concentrated extract, and spray-drying the mixture.

References Cited in the file of this patent
UNITED STATES PATENTS

| 87,346 | Lewis | Mar. 2, 1869 |
| 1,151,373 | Morley | Aug. 24, 1915 |
| 1,897,393 | Livingston | Feb. 14, 1933 |
| 2,116,308 | Gore et al. | May 3, 1938 |